United States Patent [19]
France

[11] Patent Number: 5,145,133
[45] Date of Patent: Sep. 8, 1992

[54] TARGET HOLDER

[76] Inventor: Robert W. France, 31034 Gowdyville Rd., Cottage Grove, Oreg. 97424

[21] Appl. No.: 692,622

[22] Filed: Apr. 29, 1991

[51] Int. Cl.⁵ .............................................. F41J 1/00
[52] U.S. Cl. .................................. 248/168; 273/407; 248/291; 248/455
[58] Field of Search ............... 248/166, 168, 454, 465, 248/455, 451, 292.1, 291; 273/403, 404, 407, 127 D, 181 R

[56] References Cited

U.S. PATENT DOCUMENTS

| | | | |
|---|---|---|---|
| 429,942 | 6/1890 | McBride | 273/407 |
| 1,525,339 | 2/1925 | Toohey | 273/407 |
| 2,522,270 | 9/1950 | Hoffman | 248/465 |
| 2,899,204 | 8/1959 | Ratay | 273/407 X |
| 4,609,174 | 9/1986 | Nakatani | 248/168 X |
| 4,625,974 | 12/1986 | Andrews | 273/407 |
| 5,005,795 | 4/1991 | Holmgren | 248/455 X |

FOREIGN PATENT DOCUMENTS

| | | | |
|---|---|---|---|
| 2545677 | 4/1977 | Fed. Rep. of Germany | 273/407 |
| 14227 | of 1890 | United Kingdom | 248/168 |
| 2345 | of 1908 | United Kingdom | 248/465 |

Primary Examiner—Karen J. Chotkowski
Attorney, Agent, or Firm—John F. Ingman

[57] ABSTRACT

A folding target holder involves a hinge board with two front legs fixedly attached thereto and a rear leg pivotally attached therebetween and having an upper bevelled surface which, in the unfolded position, abuts the hinge board. In the folded position, the rear leg pivots to a co-planar position between the front legs. The legs are each individually adjustable in length. A target board is hinged at an edge to the lower edge of the hinge board so that, in the folded position the target board extends downward in the same plane as the hinge board and lays against the front legs and folded rear leg. When unfolded, the target board pivots upwardly with its lower portion lying to the front of the hinge board. A separating member positioned within the angular gap between the target board and hinge board serves to physically block any further decrease in that gap. A flexible rubber member having an elongated center section and a protuberant end may be attached to the hinge board so as to have the protuberant end positionable within the angular gap. An elastic cord, which is stretched to encircle about the front of the upwardly extending target board and to the rear of the hinge board, biases the target board and the hinge board pivotally together against the separating member. The same elastic cord may be used to encircle the three legs and the target board in the folded position.

10 Claims, 2 Drawing Sheets

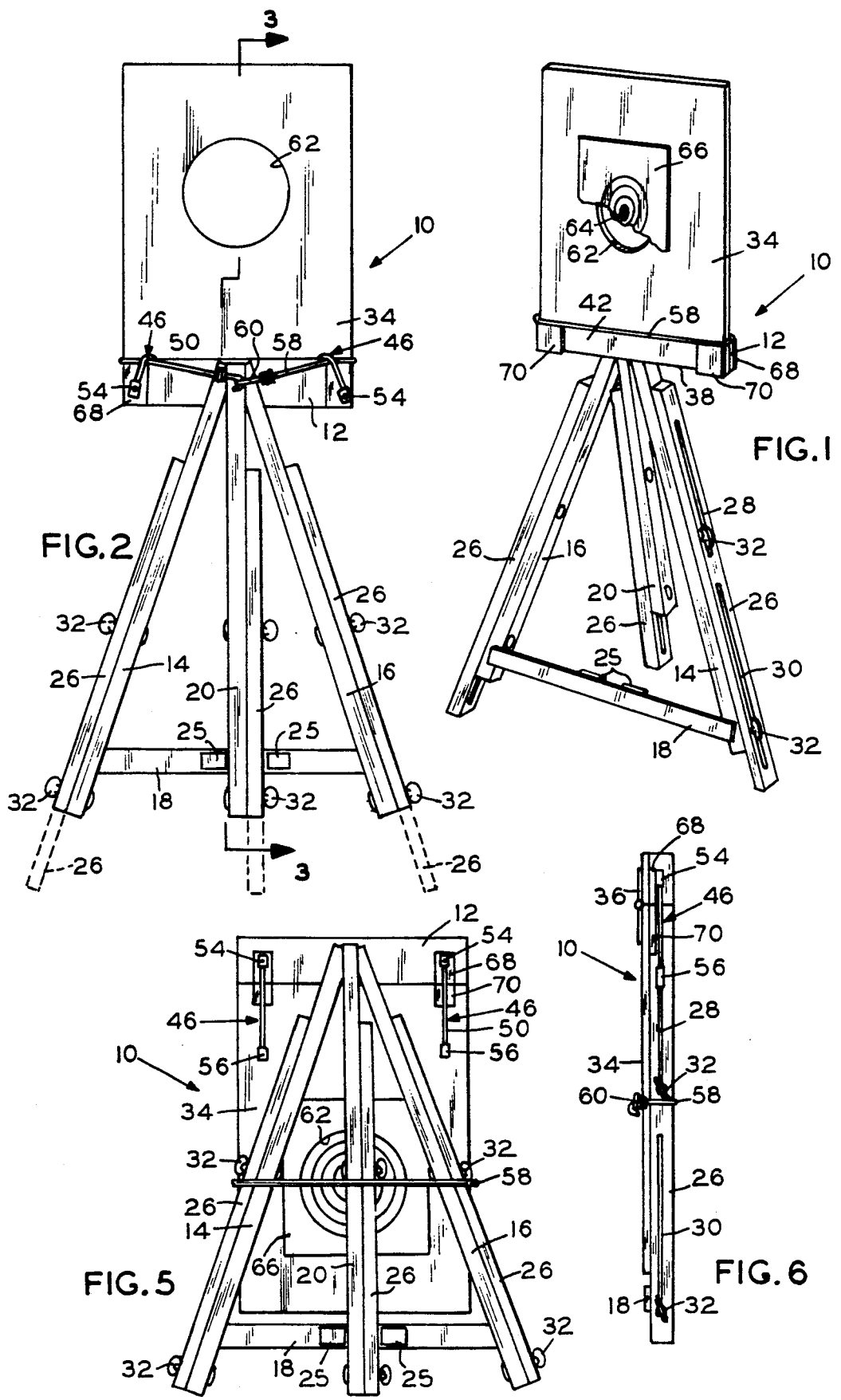

TARGET HOLDER

BACKGROUND OF THE INVENTION

1. Field of the Invention

This invention involves a target holder, and, more particularly, a portable folding target holder capable of all-terrain usage.

2. Description of the Prior Art

There are a variety of situations such as sighting in, load checks, on-course performance checks as in biathalon or silhouette events, zero checks on hunting trips, and impromptu target shooting where it is desirable to temporarily place a paper target in remote areas, with the target holder being steady and level on rough, uneven or sloping ground or snow, and above low bushes or weeds, with the face of the target being positioned generally perpendicular to the shooter.

What is needed is a lightweight, self-contained, portable, folding target holder which can be set up easily and safely in front of a good backstop without locating trees or old buildings to nail the targets to, or the bringing of scrap lumber, cardboard boxes or other materials which may be left on the land when shooting is finished. The target should be able to be prepositioned on a target board and remain thereon with folding of the target holder before and after shooting. Considering the somewhat vulnerable nature of a holder of targets, the design should be plain and simple, and replacement parts should be easy to find, buy, and install.

SUMMARY OF THE INVENTION

The present invention provides a folding target holder which is designed to meet the aforementioned needs.

Accordingly, in the preferred embodiment, the folding target holder involves a hinge board with two front legs fixedly attached thereto and diverging downwardly. A rear leg is pivotally attached to and between the two front legs and is formed so that, when unfolded, an upper bevelled surface abuts the hinge board, thereby limiting the extent the rear leg can be moved in forming a tripod-like leg arrangement. In the folded position, the rear leg pivots to a co-planar position between the front legs. The front legs and the rear leg are each individually adjustable in length, with a supplemental lower leg segment on each leg which provides a variable sliding leg extension to enable the folding target holder to be set up conveniently so as to be stable and level on essentially all types of terrain.

A target board is hinged at an edge to the lower edge of the hinge board so that, in the folded position, the target board extends downward in the same plane as the hinge board and lays against the front legs and folded rear leg. When unfolded, the target board pivots upwardly about the hinged edge so that, when extending upwardly, its lower portion lies to the front of the hinge board. Since, when completely unfolded, the hinge board will lie essentially parallel to the plane of the two front legs, it is desirable to be able to adjust the acute angle between the target board and the hinge board so that the target board extends vertically, or generally perpendicular to the line-of-shot from the user. A means of adjusting the acute angle between the target board and the hinge board may involve a separating member of any of a variety of sizes and shapes which, when placed at various depths within the angular gap between the target board and hinge board, will physically block any further decrease in the angle beyond the orientation of the target board desired. A preferred and economical form of separating member is a flexible member, such as a rubber connecting strap, having an elongated center section and at least one protuberant end. By attaching one end of the flexible member to the hinge board, the center section can be extended, generally up and over the hinge board, so that the second and protuberant end is inserted within the angular gap between the target board and the hinge board so as to prevent the angular gap from decreasing further. Means for retaining the target board at the desired acute angle in relation to the hinge board preferably involves a simple elastic cord which is stretched to encircle about the front of the upwardly extending target board and to the rear of the hinge board, so as to draw the target board and the hinge board pivotally together to the extent allowed by the separating member positioned between them. With the target holder in the folded position, the same elastic cord may be used to encircle the three legs and the target board so as to hold their relative folded positions for transport and storage.

The preferred target holder has a circular hole formed therein over which the bullseye of the target may be located, the majority of the shots hopefully passing through the hole and thus effectively extending the useful life of the target holder itself.

BRIEF DESCRIPTION OF THE DRAWINGS

FIG. 1 illustrates a perspective front view of the folding target holder in unfolded position.

FIG. 2 illustrates a rear view of the folding target holder of FIG. 1.

FIG. 5 illustrates a back elevation view of the folding target holder in folded position.

FIG. 6 illustrates a side elevation view of the folding target holder in a folded position.

DESCRIPTION OF THE PREFERRED EMBODIMENT

Figure 3:
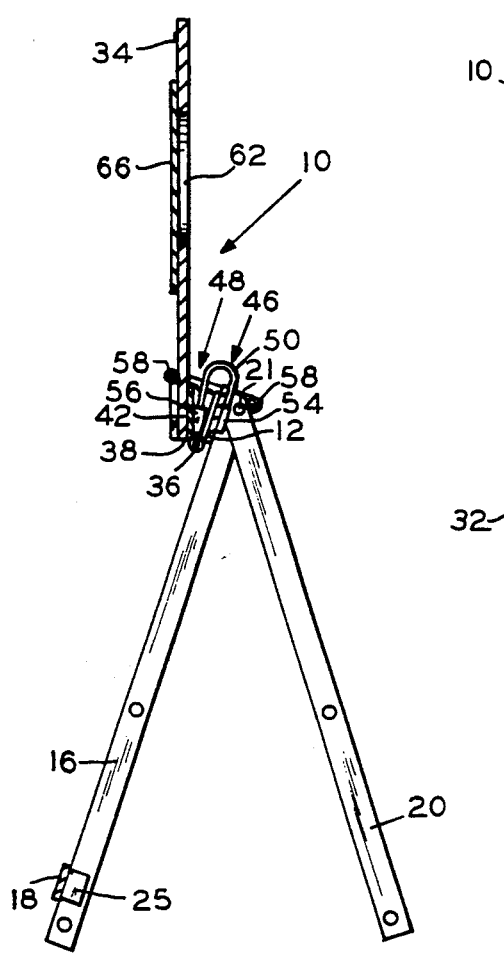
FIG. 3 illustrates a cross-sectional elevation view of the folding target holder as seen at line 3—3 of FIG. 2.

Turning now to the drawings, there is shown in FIGS. 1 through 3 the preferred embodiment of the folding target holder 10 in unfolded position, as it would be utilized for sighting and target shooting.

Figure 4:
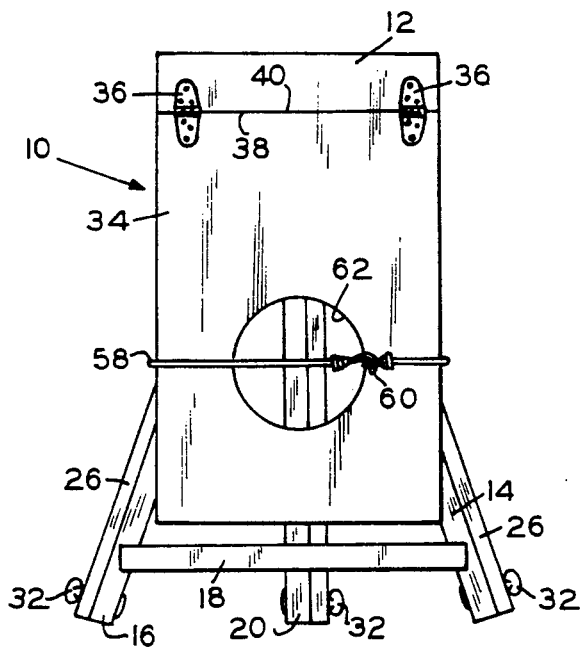
FIG. 4 illustrates a front elevation view of the folding target holder in folded position.
Figure 7:
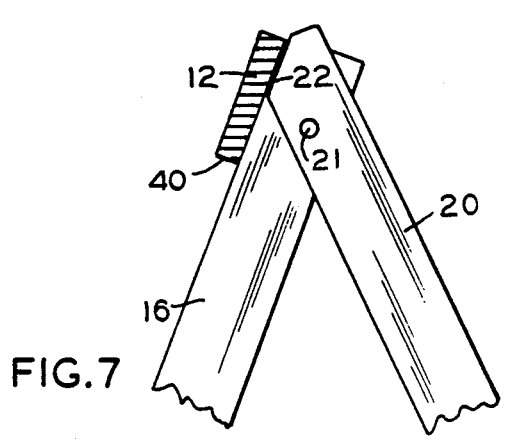
FIG. 7 illustrates an enlarged view of the rear leg abutting the hinge board.

A hinge board member 12 has two front legs 14 and 16 fixedly attached thereto and diverging downwardly. A cross member 18 extends horizontally between the front legs 14 and 16. A rear leg 20 is pivotally attached at 21 between the two front legs 14 and 16 and is formed so that, when unfolded, an upper bevelled surface 22 abuts the back surface 24 of the hinge board 12, as best seen in FIG. 7, thereby limiting the extent the rear leg 20 can be moved rearward in forming a tripod-like leg arrangement. In a folded position, as seen in FIGS. 4 through 6, the rear leg 20 pivots to a co-planar position between the front legs 14 and 16. A pair of blocks 25 are attached on the cross member 18 to provide lateral support to the rear leg 20 in the folded position. The front legs 14 and 16 and the rear leg 20 are each individually adjustable in length, with a supplemental lower leg segment 26 at each leg 14, 16, 20 which provides a variable sliding leg extension to enable the folding target holder 10 to be set up conveniently so as to be stable and level on essentially all types of terrain. The extended position of the lower leg segment 26 is adjustable. A pair of elongated slots 28 and 30 are longitudinally formed in each lower leg segment 26, by which, in conjunction with two fastening members, preferably thumb screws 32 threadingly engaging each of the legs 14, 16, and 20 at fixed locations, the lower leg segments 26 may be slidingly positioned and locked in place.

Figure 8:
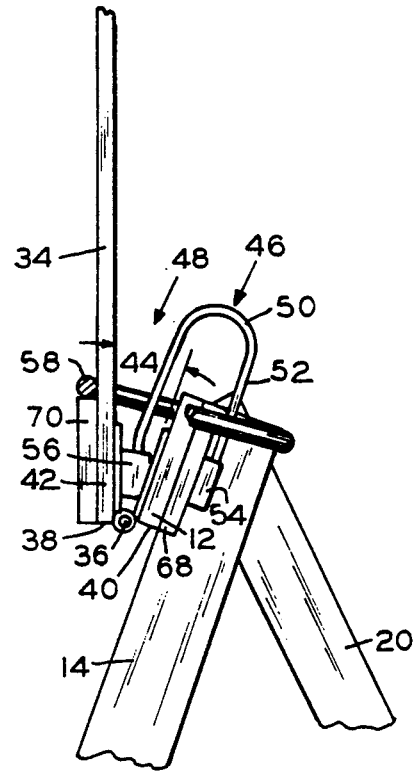
FIG. 8 illustrates an enlarged view of the preferred means for angle adjustment between the hinge board and the target board.

A target board 34 is attached by hinges 36 at an edge 38 to the lower edge 40 of the hinge board 12 so that, in the folded position, as seen in FIGS. 4 through 6, the target board 34 extends downward in the same plane as the hinge board 12 and lies against the front legs 14 and 16 and folded rear leg 20. When unfolded, the target board 34 pivots upwardly at the hinges 36 so that, when upwardly extending, its lower portion 42 now lies to the front of the hinge board 12. Since, when completely unfolded, the hinge board 12 may lie parallel to the normally non-vertical plane of the two front legs 14 and 16, it is desirable to be able to adjust the acute angle 44 between the target board 34 and the hinge board 12 so that the target board 34 extends vertically, or, as desired, perpendicular to the line-of-shot from the user. The means of adjusting the angle 44 between the target board 34 and the hinge board 12 involves a separating member 46 which, when placed at various depths within the angular gap 48 between the target board 34 and hinge board 12, will physically block any further decrease in the angle 44 beyond the orientation of the target board 34 desired. A preferred, economically available, form of separating member 46, as best seen at FIG. 8, is a flexible member 50 having an elongated center section 52 and at least one protuberant end 54. As illustrated, a flexible rubber connecting strap of about 12-inches in length may be used. By attaching one end 56 of the flexible member 50 to the hinge board 12, or its reinforcing block 68, the center section 52 can be extended up and over the hinge board 12, so that the second and protuberant end 54 is inserted within the angular gap 48 between the target board 34 and the hinge board 12, thereby preventing the angular gap 48 from decreasing further. Since the protuberant end 54 preferably is assymetrical, it may be rotated to provide alternative thickness of separating member 46. Means for retaining the target board 34 at the desired angle 44 in relation to the hinge board 12 during shooting preferably involves a common elastic cord 58 with hook ends 60 which is stretched to encircle in front of the upwardly extending target board 34 and to the rear of the hinge board 12 so as to draw the target board 34 and the hinge board 12 pivotally together to the extent allowed by the separating member 46 positioned between them. With the target holder 10 in the folded position, the same elastic cord 58 encircles the three legs 14, 16, and 20 and the target board 34 so as to hold their relative folded positions for transport and storage.

The preferred folding target holder 10 has a circular hole 62 formed therein over which the bullseye 64 of the target 66 may be located, the majority of shots hopefully passing through the hole 62 and thus minimizing bullet holes in the folding target holder 10 itself. As seen in FIG. 5, the target 66 may be prepositioned on the target board 34 in a secure position during movement.

In a preferred embodiment for general use, the target board 34 and hinge board 12 are formed of 7/16-inch plywood or wafer board. A convenient size for the target board 34 is 30-inches high by 20-inches wide with a hole 62 formed therein of 8-inches in diameter. The legs, 14, 16, and 20 each are 1½- by 1½- by 40-inches while the supplemental lower leg segments 26 are 1½- by ⅞- by 36-inches, which in use may additionally extend the length of the legs 14, 16, 20 approximately 15-inches. For sturdiness, particularly in attaching the hinges 36, reinforcing blocks 68 and 70 may be attached to the hinge board 12 and target board 34 respectively. Such blocks 68 on the hinge board 12 may also provide a base for attachment of the preferred separating member 46.

It is thought that the folding target holder 10 of the present invention and its many attendant advantages will be understood from the foregoing description and that it will be apparent that various changes may be made in form, construction and arrangement of the parts thereof without departing from the spirit and scope of the invention or sacrificing all of its material advantages, the forms hereinbefore stated being merely exemplary embodiments thereof.

I claim:

1. A folding target holder, comprising:
   a. a hinge board, having a lower edge;
   b. two front legs fixedly attached to the hinge board and diverging downwardly;
   c. a rear leg pivotally attached to and between said two front legs;
   d. said rear leg folding to a co-planar position between said two front legs;
   e. a target board hinged at an edge to the lower edge of the hinge board so that, with the folding target holder in a folded position, the target board lies in the plane of the hinge board against said front and rear legs, and with the folding target holder in an extended, unfolded position, the target board is rotated so that the upwardly extending target board forms an acute angle with the hinge board;
   f. means for adjusting the acute angle between the target board and the hinge board; and
   g. means for biasing the target board to the acute angle between the target board and the hinge board.

2. The folding target holder, as recited in claim 1, wherein said front legs and rear leg including means for adjusting length of said legs.

3. The folding target holder, as recited in claim 2, wherein said means for adjusting length of said legs includes supplemental lower leg segments which slidingly extend and lock beyond said front legs and rear leg.

4. The folding target holder, as recited in claim 1, where the means for biasing the target board to the acute angle between the target board and the hinge board includes an elastic cord which encircles about the upwardly extending target board and the hinge board so as to draw the target board and the hinge board pivotally together to the extent permitted by the means for adjusting the acute angle between the target board and the hinge board.

5. The folding target holder, as recited in claim 1, where the means for adjusting the acute angle between the target board and the hinge board includes a separating member which, when placed at various depths within the acute angle, will physically block further unfolding rotation of the target board and resulting further decrease in said acute angle.

6. The folding target holder, as recited in claim 5, wherein the separating member includes a flexible member having an elongated center section and at least one protuberant end, wherein the protuberant end is inserted at a desired location within the acute angle between the target board and the hinge board and the other end is secured to the folding target holder.

7. The folding target holder, as recited in claim 1, wherein additionally said target board has a circular hole formed therein over which the bullseye of a target may be located.

8. The folding target holder, as recited in claim 4, wherein, when in the folded position, said elastic cord encircles the three legs and the target board so as to retain their relative folded positions for transport and storage.

9. The folding target holder, as recited in claim 1, wherein the rear leg has an upper surface which, when the rear leg is unfolded, abuts the hinge board to limit rearward movement of the rear leg.

10. A folding target holder, comprising:
a. a hinge board, having a lower edge;
b. two front legs fixedly attached to the hinge board and diverging downwardly;
c. a rear leg pivotally attached to and between said two front legs and having an upper surface which, when the rear leg is unfolded, abuts the hinge board to limit rearward movement of the rear leg;
d. said rear leg folding to a co-planar position between said two front legs;
e. said front legs and rear leg including means for adjusting length of said legs including supplemental lower leg segments which slidingly extend and lock beyond said front legs and rear leg;
f. a target board hinged at an edge to the lower edge of the hinge board so that, with the folding target holder in a folded position, the target board lies in the plane of the hinge board against said front and rear legs, and with the folding target holder in an extended, unfolded position, the target board is rotated so that the upwardly extending target board forms an acute angle with the hinge board;
g. means for adjusting the acute angle between the target board and the hinge board which include a separating member which, when placed at various depths within the acute angle, will physically block further unfolding rotation of the target board and resulting further decrease in said acute angle, said separating member being flexible and having an elongated center section and at least one protuberant end, wherein the protuberant end is inserted at a desired location within the acute angle between the target board and the hinge board and the other end is secured to the folding target holder;
h. means for biasing the target board to the acute angle between the target board and the hinge board which include an elastic cord which encircles about the upwardly extending target board and the hinge board so as to draw the target board and the hinge board pivotally together to the extent permitted by the means for adjusting the acute angle between the target board and the hinge board.

* * * * *